United States Patent [19]

Kakehi et al.

[11] Patent Number: 5,635,641

[45] Date of Patent: Jun. 3, 1997

[54] VIBRATORY GYROSCOPE WITH REDUCED STRESS AND STABLE CHARACTERISTICS

[75] Inventors: Sasuga Kakehi; Katsumi Fujimoto, both of Nagaokakyo, Japan

[73] Assignee: Murata Manufacturing Oc., Ltd., Kyoto-Fu, Japan

[21] Appl. No.: 390,429

[22] Filed: Feb. 17, 1995

Related U.S. Application Data

[63] Continuation of Ser. No. 110,793, Aug. 23, 1993, abandoned.

[30] Foreign Application Priority Data

| Aug. 31, 1992 | [JP] | Japan | 4-257446 |
| Nov. 20, 1992 | [JP] | Japan | 4-335014 |

[51] Int. Cl.⁶ ........................................... G01P 9/04
[52] U.S. Cl. ........................................ 73/504.14; 310/351
[58] Field of Search ..................... 73/504.12, 504.13, 73/504.14, 504.15, 504.16; 310/316, 329, 351

[56] References Cited

U.S. PATENT DOCUMENTS

| 3,590,287 | 6/1971 | Berlincourt et al. | 310/321 |
| 4,454,444 | 6/1984 | Fujiwara et al. | 310/360 |
| 4,511,821 | 4/1985 | Nakamura et al. | 73/351 |
| 4,635,009 | 1/1987 | Ebata | 310/313 D |
| 4,674,331 | 6/1987 | Watson | 73/505 |
| 4,836,023 | 6/1989 | Oikawa | 73/505 |
| 4,898,031 | 2/1990 | Oikawa et al. | 73/505 |
| 5,014,554 | 5/1991 | Terada et al. | 73/505 |
| 5,220,833 | 6/1993 | Nakamura | 73/505 |
| 5,226,324 | 7/1993 | Oikawa et al. | 73/505 |

*Primary Examiner*—Hezron E. Williams
*Assistant Examiner*—Helen C. Kwok
*Attorney, Agent, or Firm*—Nikaido Marmelstein Murray & Oram LLP

[57] ABSTRACT

A vibratory gyroscope includes, for example, a triangular columnar vibrating body formed with a non-metallic material. On three side faces of the vibrating body, patterned electrodes extending to the vicinity of one nodal point from the center portion are formed. One electrodes of piezoelectric elements are bonded to the patterned electrodes. The vibrating body has a larger Q than the piezoelectric element and a thermal expansion coefficient approximate to the piezoelectric element. Patterned electrodes are formed to the vicinity of the other nodal point of the vibrating body from the other electrodes of the piezoelectric elements. Support members formed with a conductive material are fixed to the patterned electrodes formed on two side faces of the vibrating body in the vicinity of the nodal points of the vibrating body. The support members are connected electrically to the patterned electrodes. Lead wires are connected to the patterned electrodes formed on another side face of the vibrating body in the vicinity of the nodal points of the vibrating body.

12 Claims, 4 Drawing Sheets

F I G. 1
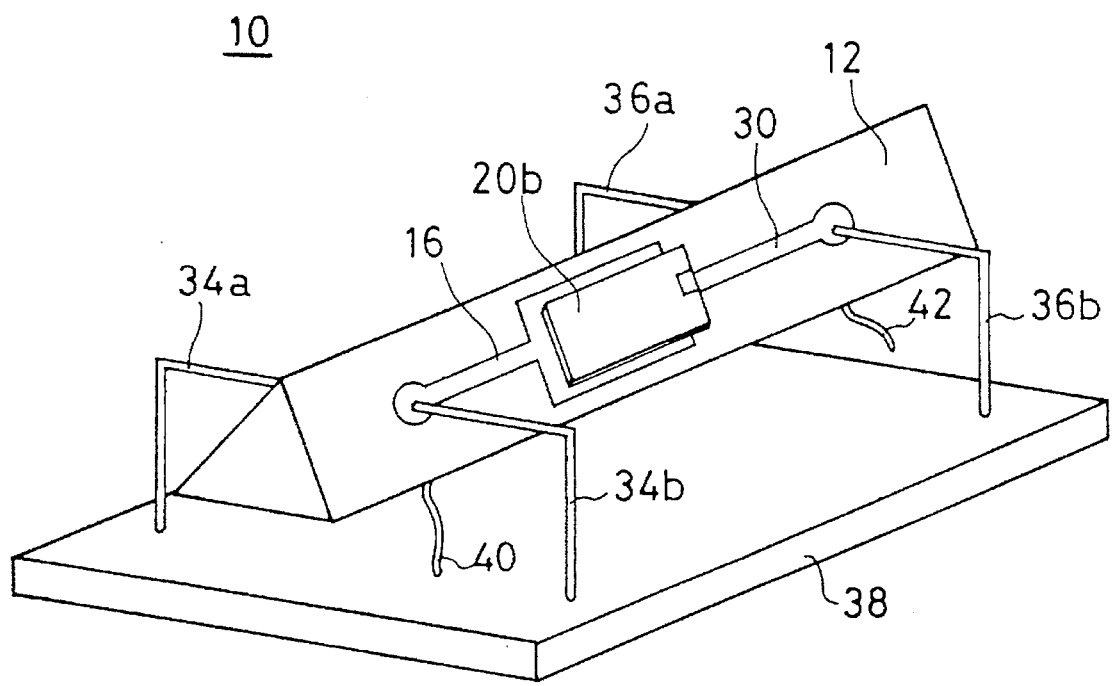
F I G. 2
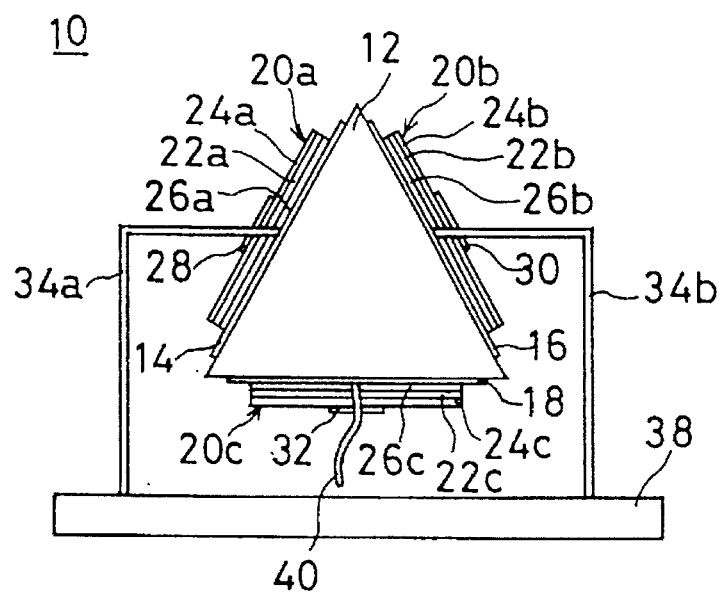

VIBRATORY GYROSCOPE WITH REDUCED STRESS AND STABLE CHARACTERISTICS

SPECIFICATION

This application is a continuation of application Ser. No. 08/110,793 filed Aug. 23, 1993 now abandoned.

BACKGROUND OF THE INVENTION

1. Field of the Invention

The present invention relates to a vibratory gyroscope, and particularly to a vibratory gyroscope applicable in, for example, a navigation system which detects an angular velocity to detect a position of a moving object for proper guidance, or a yaw rate sensor which detects an external vibration for proper damping and the like.

2. Description of the Prior Art

FIG. 5 is a perspective view showing an example of a conventional vibratory gyroscope serving as a background of the present invention, and FIG. 6 is its side view. The vibratory gyroscope 1 includes a vibrating body 2. On side faces of the vibrating body 2, piezoelectric elements 3a, 3b and 3c are formed respectively. The piezoelectric elements 3a, 3b and 3c are formed with electrodes on both surfaces of piezoelectric ceramics. The piezoelectric elements 3a, 3b and 3c are bonded in the side faces of the vibrating body 2 by means of soldering, conductive adhesives or the like. To the piezoelectric elements 3a, 3b and 3c, lead wires 4a, 4b and 4c are connected to the vicinity of nodal points of the vibrating body 2 by means of bonding or soldering. The lead wires 4a, 4b and 4c are used for inputting and outputting the signals to and from the piezoelectric elements 3a, 3b and 3c. The reason for connecting the lead wires 4a, 4b and 4c in the vicinity of the nodal points of the vibrating body 2 is for preventing the characteristic deterioration of the vibratory gyroscope 1 due to the leakage of vibration of the vibrating body 2 through the lead wires.

The vibrating body 2 is supported by support members 5 at ridge portions in the vicinity of its nodal points, and the support members 5 are fixed to a support base 6. In order to minimize a thermal stress at the time of bonding the piezoelectric elements 3a, 3b and 3c to the side faces of the vibrating body 2, and a stress exerted on the piezoelectric elements 3a, 3b and 3c by changes in atmospheric temperature, a thermal expansion coefficient of the vibrating body 2 and that of the piezoelectric elements 3a, 3b and 3c must be coincided. Hence, for example, a Ni—Fe alloy having the thermal expansion coefficient close to that of the piezoelectric ceramics is used as a material of the vibrating body 2.

In the vibratory gyroscope 1, between the piezoelectric elements 3a, 3b and the piezoelectric element 3c, an oscillation circuit and the like is connected as a feedback loop for self-oscillation drive. The vibrating body 2 is bent and vibrated in a direction perpendicular to a surface of the piezoelectric element 3c by a driving signal from the oscillation circuit. When the vibratory gyroscope is rotated about an axis of the vibrating body 2 in this state, the vibrating direction of the vibrating body 2 is changed by a Coriolis force, and the output difference is produced between the piezoelectric elements 3a and 3b. A rotational angular velocity can be detected by measuring the output difference. In this vibratory gyroscope 1, the ridge portion of the vibrating body 2 is cut to adjust the frequency and sensitivity.

In such a vibratory gyroscope, since the lead wires 4a–4c are connected in the vicinity of the nodal points of the vibrating body 2, the piezoelectric elements 3a–3c must be formed into the size including the vicinity of the nodal points of the vibrating body 2. However, generally, the piezoelectric ceramics used in the piezoelectric elements 3a–3c has a low Q (i.e. quality factor). Hence, when the piezoelectric elements 3a–3c are large, even when a material having the high Q (i.e. quality factor) is used as the material of the vibrating body 2, Q is low as the entire vibratory gyroscope.

When metallic materials are used as the material of the vibrating body 2, when the ridge portion of the vibrating body 2 is cut to adjust the frequency and sensitivity of the vibratory gyroscope 1, a burr 7 as shown in FIG. 7 is produced by a ductility of the metal. When such a burr 7 is produced, a plurality of characteristics of the vibratory gyroscope 1 become unstable.

SUMMARY OF THE INVENTION

It is, therefore, a primary object of the present invention to provide a vibratory gyroscope having stable characteristics and a high Q.

The present invention is directed to a vibratory gyroscope comprising: a columnar vibrating body formed with a non-metallic material; patterned electrodes formed so as to extend to the vicinity of nodal points from the center portion of side faces of the vibrating body; piezoelectric elements fixed to the patterned electrodes; and support members fixed to the vicinity of the nodal points of the vibrating body, and electrically connected to the patterned electrodes; wherein the vibrating body has a higher Q than the piezoelectric elements and a thermal expansion coefficient approximate to the piezoelectric elements.

By using the non-metallic material having the Q higher than the piezoelectric elements as the material of the vibrating body, the Q of the entire vibratory gyroscope becomes higher. As such non-metallic material, those having the thermal expansion coefficient close to the piezoelectric ceramics used in the piezoelectric elements is used. The non-metallic material has no ductility as the metallic material. Signals are input to and output from the piezoelectric elements through the support members fixed to the patterned electrodes formed on the vibrating body. The supporting members are fixed in the vicinity of the nodal points of the vibrating body.

According to the present invention, since the thermal expansion coefficient of the non-metallic material used in the vibrating body and that of the piezoelectric ceramics used in the piezoelectric elements are close to each other, even when the atmospheric temperature changes, stresses exerted on the piezoelectric elements is small. Hence, characteristic temperature stability of the vibratory gyroscope is good. Since the non-metallic material has no ductility, even when the vibrating body is cut to adjust the frequency and sensitivity, a burr never occurs at cut portions. Hence, a plurality of characteristics of the vibratory gyroscope can be stabilized. Since the support members used for inputting and outputting the signals and for holding the vibrating body are connected to the electrodes formed on the vibrating body, the piezoelectric elements need not be enlarged. Hence, a rate of volume of the piezoelectric elements relative to the vibrating body is small, and by using the non-metallic material, having a higher Q than the piezoelectric elements as the material of the vibrating body, Q of the entire vibratory gyroscope can be raised.

The above and other objects, features, aspects and advantages of the present invention will become more apparent from the following detailed description of the embodiments made with reference to the drawings.

BRIEF DESCRIPTION OF THE DRAWINGS

FIG. 1 is perspective view showing one embodiment of the present invention.

FIG. 2 is a side view of a vibratory gyroscope shown in FIG. 1.

DESCRIPTION OF THE PREFERRED EMBODIMENTS

Figure 3:
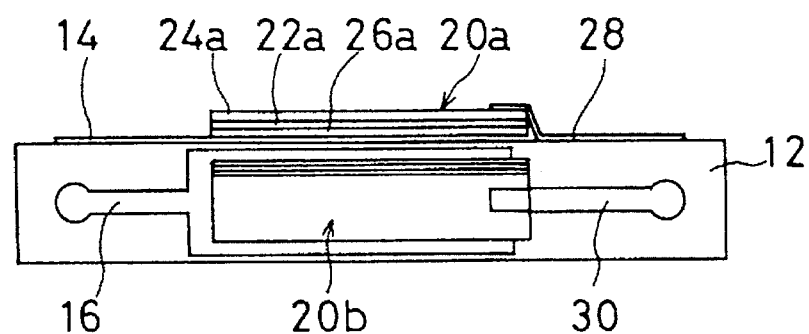
FIG. 3 is an illustrative view showing the relationship between a pattern electrode and a piezoelectric element of the vibratory gyroscope shown in FIG. 1.

FIG. 1 is a perspective view showing one embodiment of the present invention, and FIG. 2 is its side view. A vibratory gyroscope 10 includes a vibrating body 12. The vibrating body 12 is formed into a right triangular column with, for example, an insulated non-metallic material such as a dielectric, alumina, glass and the like. As the materials of the vibrating body 12, those having a larger Q (quality factor) than a piezoelectric element to be described later and a thermal expansion coefficient approximate to the piezoelectric element are used. On three side faces of the vibrating body 12, patterned electrodes 14, 16 and 18 are formed respectively. The patterned electrode 14 is consisting of a rectangular plane portion formed at the center portion of one side face of the vibrating body 12, and an extended portion extending to the vicinity of one nodal point of the vibrating body 12 from the rectangular plane portion. Similarly, the patterned electrodes 16, 18 are consisting of rectangular plane portions formed at the center portion of side faces of the vibrating body 12, and extended portions extending to the vicinity of one nodal points of the vibrating body 12. The patterned electrodes 14, 16 and 18 are formed by means of, for example, plating, vacuum evaporation and the like which is formed into the drive described shape (pattern).

On the rectangular plane portions of the patterned electrodes 14, 16 and 18, piezoelectric elements 20a, 20b and 20c are formed respectively. The piezoelectric element 20a includes a piezoelectric body 22a, on both faces of the piezoelectric body 22a electrodes 24a and 26a are formed. One electrode 26a is bonded to the patterned electrode 14 formed on the vibrating body 12. Similarly, the piezoelectric elements 20b, 20c include piezoelectric bodies 22b, 22c, on both faces of the piezoelectric body 22b electrodes 24b, 26b are formed, and on both faces of the piezoelectric body 22c electrodes 24c, 26c are formed. One electrodes 26b and 26c of the piezoelectric elements 20b and 20c are bonded to the patterned electrodes 16 and 18 of the vibrating body 12.

Other patterned electrodes 28, 30 and 32 are formed so as to extend to the vicinity of the other nodal points of the vibrating body 12 from the electrodes 24a, 24b and 24c of the piezoelectric elements 20a, 20b and 20c. The patterned electrodes 28, 30 and 32 are formed, as shown in FIG. 3, from the electrodes 24a, 24b and 24c of the piezoelectric elements 20a, 20b and 20c to the side faces of the vibrating body 12 by means of vacuum evaporation and the like.

Support members 34a and 34b are formed so as to be connected to the patterned electrodes 14 and 16, in the vicinity of one nodal point of the vibrating body 12. For example, a metal material or a metal plated insulation material is used for the support members 34a and 34b. The support members 34a and 34b consist of wires using these materials formed into a hooked shape. One end of the support members 34a and 34b is fixed to the vibrating body 12 and connected electrically to the patterned electrodes 14 and 16 of the vibrating body 12. Similarly, one end of the support members 36a and 36b are fixed so as to be connected electrically to the patterned electrodes 28 and 30, in the vicinity of the other nodal point of the vibrating body 12. Other ends of the support members 34a, 34b and the support members 36a, 36b are fixed to a plate-shaped support base 38.

In the vibratory gyroscope 10, the support members 34a, 34b, 36a and 36b hold the vibrating body 12, and at the same time, are used for inputting and outputting the signals of the piezoelectric elements 20a and 20b. Lead wires 40 and 42 are connected to the patterned electrodes 18 and 32 connected to another piezoelectric element 20c in the vicinity of the nodal points of the vibrating body 12. The support members 34a, 34b and the lead wire 40 are used for grounding the piezoelectric elements 20a, 20b and 20c. By the support members 36a, 36b and the lead wire 42, the signals are input to and output from the piezoelectric elements 20a, 20b and 20c.

When using the vibratory gyroscope 10, for example, an oscillation circuit as a feedback loop for self-oscillation drive is connected between the support members 36a, 36b and the lead wire 42. By the signal from the oscillation circuit, the vibrating body 12 bends and vibrates in a direction perpendicular to the surface of the piezoelectric element 20c. When the vibratory gyroscope 10 is rotated about its axis in this state, the vibrating direction of the vibrating body 12 is changed due to a Coriolis force. Thereby, the difference is produced between voltages generated in the piezoelectric elements 20a and 20b used for detecting the output signals, and a rotational angular velocity can be detected by measuring the output difference.

A ridge portion of the vibrating body 12 is cut to adjust the frequency and sensitivity of the vibratory gyroscope 10. At this time, since the vibrating body 12 is made of a non-metallic material such as ceramics, there is no ductility such as a metallic material and a burr does not occur. Hence, characteristic deterioration of the vibratory gyroscope 10 due to the burr can be prevented. The thermal expansion coefficients of the vibrating body 12 and the piezoelectric bodies 22a, 22b and 22c of the piezoelectric elements 20a, 20b and 20c are substantially equal, and there is little effect of stresses due to changes in atmospheric temperature.

The thermal expansion coefficient of the vibrating body 12 and the piezoelectric bodies 22a, 22b and 22c are preferably about $1 \times 10^{-6}/°C$ to $8 \times 10^{-6}/°C$. Generally, the thermal expansion coefficient of the piezoelectric bodies 22a, 22b and 22c is about $1 \times 10^{-6}/°C$ to $4 \times 10^{-6}/°C$. The thermal expansion coefficient of alumina used as the material of the vibrating body 12 is $8.4 \times 10^{-6}/°C$, and that of glass is about $1 \times 10^{-6}/°C$ to $10 \times 10^{-6}/°C$. As an example of glass used in such vibrating body 12, there is Pyrex (registered trade mark) made by Corning Glass Works Inc., having the thermal expansion coefficient of $3.3 \times 10^{-6}/°C$.

Since the signals are input to and output from the piezoelectric elements 20a, 20b and 20c via the patterned electrodes 14, 16 and 18 and the patterned electrodes 28, 30, and 32 formed on the vibrating body 12, the piezoelectric elements 20a, 20b and 20c need not be made larger so as to include the vicinity of the nodal points. Hence, a rate of volume of the piezoelectric elements 20a, 20b and 20c relative to the vibrating body 12 is small, and by using the vibrating body 12 having a higher Q than the piezoelectric elements 20a, 20b and 20c, the Q of the entire vibratory gyroscope 10 can be raised.

The Q of the entire vibratory gyroscope 10 is the composite Q (or quality factor) of the vibrating body 12 and the piezoelectric elements 20a, 20b and 20c. That is, the Q of the vibratory gyroscope 10 is decided by a volume ratio between the vibrating body 12 and the piezoelectric elements 20a, 20b and 20c and their Q. The Q of the vibratory gyroscope 10 is preferably 3000 or more. However, judging from the present technological level, the Q of the piezoelectric elements 20a, 20b and 20c is within the limit of 2000–2500. Hence, when taking into account of the deterioration of Q by bonding of the piezoelectric elements, the Q of the vibrating body 12 must be 5000 or more. Therefore, as the material of vibrating body 12 having the Q of about 5000–10000, alumina and glass as the above-mentioned Pyrex are used.

Besides, since the support members 34a, 34b and the support members 36a, 36b are fixed to the vicinity of the nodal points of the vibrating body 12, the vibration leakage of the vibrating body is small.

In the above-mentioned embodiment, though the piezoelectric elements 20a, 20b and 20c are formed respectively on three side faces of the vibrating body 12, only the two piezoelectric elements 20a and 20b may be formed. In this case, the support members 36a, 36b are connected to the patterned electrodes 28, 30 connected to the electrodes 24a, 24b of the piezoelectric elements 20a, 20b, and the support members 34a, 34b are connected to the patterned electrodes 14, 16 connected to the electrodes 26a, 26b of the piezoelectric elements 20a, 20b. The support members 36a, 36b are used for inputting and outputting the signals, and the support members 34a, 34b are used for feedback. Thus, in such a vibratory gyroscope, the lead wire can be completely omitted, and the vibration leakage of the vibrating body 12 can be reduced still further.

Figure 4:
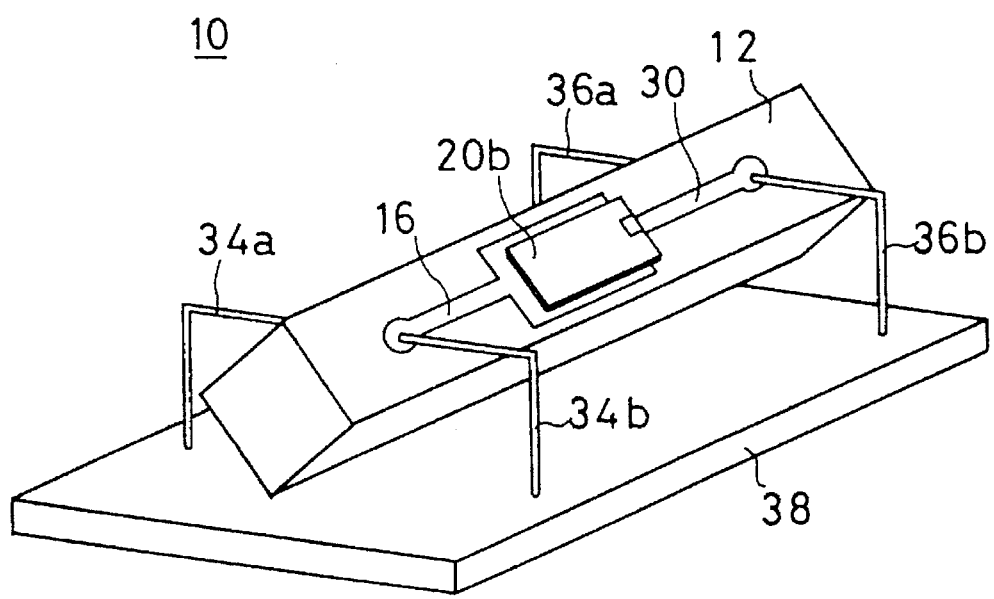
FIG. 4 is a perspective view showing another embodiment of the present invention.
Figure 5:
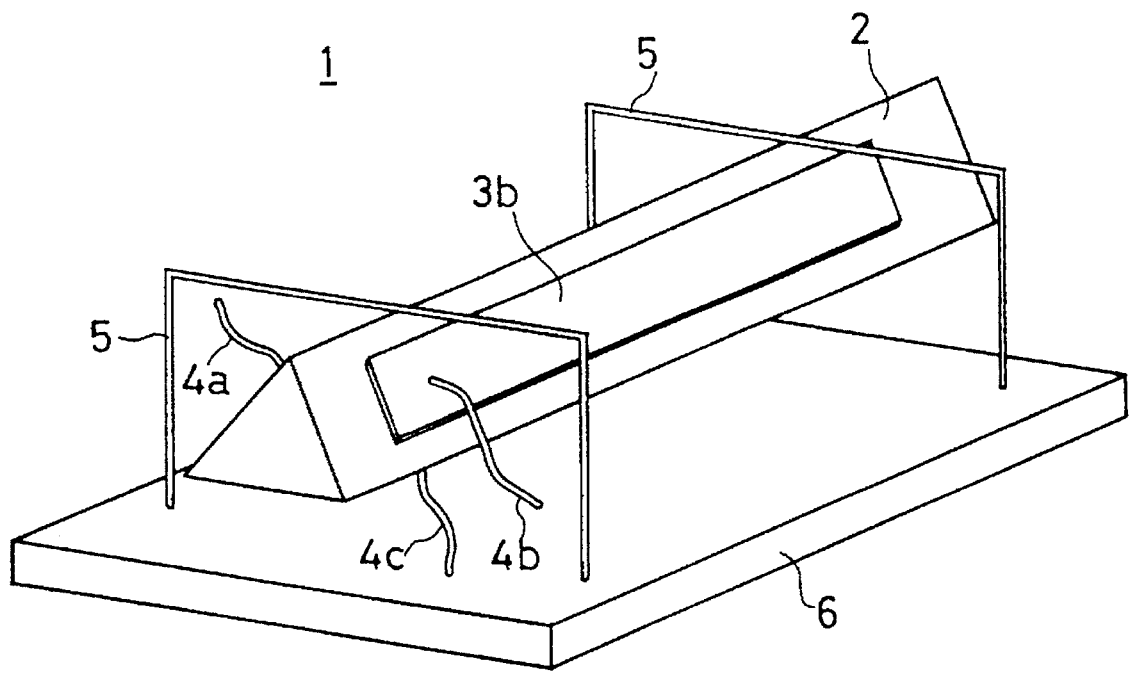
FIG. 5 is a perspective view showing an example of a conventional vibratory gyroscope serving as a background of the invention.
Figure 6:
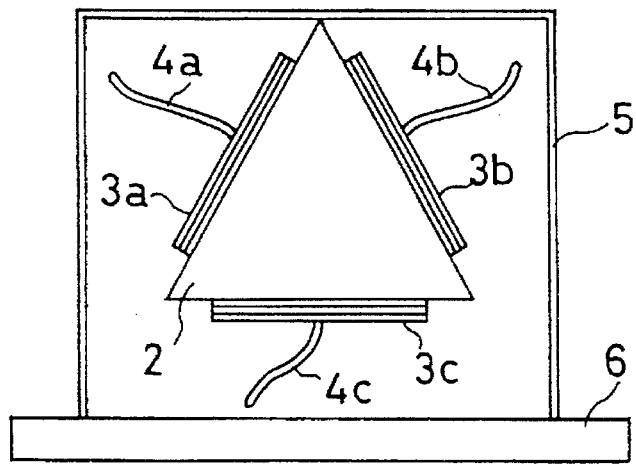
FIG. 6 is a side view of a conventional vibratory gyroscope shown in FIG. 5.
Figure 7:
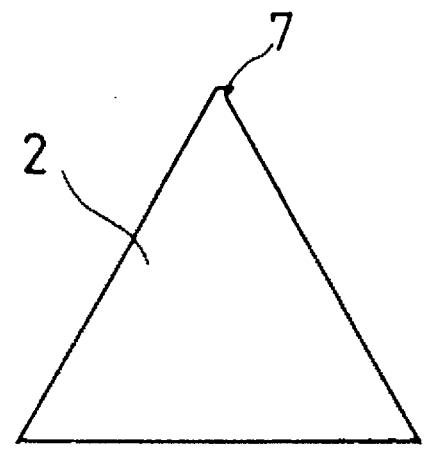
FIG. 7 is an illustrative view showing a state where a ridge portion of the vibrating body of a conventional vibratory gyroscope shown in FIG. 5 is cut.

Meanwhile, in the aforementioned embodiments, though a right triangular columnar shape was used as the shape of the vibrating body 12, as shown in FIG. 4, other columnar vibrating bodies such as a quadrangular column may be used. In this embodiment, the patterned electrodes 14, 16, the piezoelectric elements 20a, 20b and the patterned electrodes 28, 30 are formed on two adjacent side faces of the vibrating body 12. The support members 34a and 34b are connected to the patterned electrodes 14 and 16, and the support members 36a and 36b are connected to the patterned electrodes 28 and 30. In this case, same effects as the case using the right triangular columnar vibrating body can be obtained. It will be appreciated that the piezoelectric elements may be formed on four side faces of the vibrating body 12. In this case, an oscillation circuit may be connected between the upper two adjacent piezoelectric elements and the lower two adjacent piezoelectric elements to measure the output difference between the upper two piezoelectric elements.

As such, in the vibratory gyroscope of the present invention, a shape of the vibrating body and the number of piezoelectric elements can be changed optionally. By forming the electrodes extending to the vicinity of the nodal points, and fixing the piezoelectric elements onto the vibrating body, the piezoelectric elements can be minimized. Hence, by using the ceramics and glass having a high Q as the material of the vibrating body, the frequency and sensitivity can be adjusted without deteriorating characteristics, and besides, the vibratory gyroscope having the high Q as a whole can be obtained.

While the present invention has been particularly described and shown, it is to be understood that such description is used merely as an illustration and example rather than limitation, and the spirit and scope of the present invention is determined solely by the terms of the appended claims.

What is claimed is:

1. A vibratory gyroscope comprising:

a columnar vibrating body formed with side faces and formed of a non-metallic material;

patterned electrodes directly formed on a surface of the vibrating body so as to extend from center portions of said side faces of said vibrating body to vicinities of nodal points;

piezoelectric elements fixed to said patterned electrodes; and support members fixed to the vicinities of the nodal points of said vibrating body, and said support members directly electrically connected to said patterned electrodes for inputting and outputting signals through said support members, wherein said vibrating body has a higher quality factor than said piezoelectric elements and a thermal expansion coefficient approximate to said piezoelectric elements.

2. A vibratory gyroscope in accordance with claim 1, wherein said thermal expansion coefficient of said vibrating body is within a range of $1\times10^{-6}/°C.$ to $10\times10^{-6}/°C.$, and the thermal expansion coefficient of said piezoelectric elements is within the range of $1\times10^{-6}/°C.$ to $4\times10^{-6}/°C.$ 3. A vibratory gyroscope in accordance with claim 1, wherein said vibrating body has a triangular columnar shape.

4. A vibratory gyroscope in accordance with claim 2, wherein said vibrating body has a triangular columnar shape.

5. A vibratory gyroscope in accordance with claim 1, wherein said vibrating body has a quadrangular columnar shape.

6. A vibratory gyroscope in accordance with claim 2, wherein said vibrating body has a quadrangular columnar shape.

7. A vibratory gyroscope in accordance with claim 1, wherein the quality factor of said vibrating body is 5000 or more.

8. A vibratory gyroscope in accordance with claim 1, wherein said vibrating body is consisting of alumina.

9. A vibratory gyroscope in accordance with claim 1, wherein said vibrating body is consisting of glass.

10. A vibratory gyroscope in accordance with claim 2, wherein Q of said vibrating body is 5000 or more.

11. A vibratory gyroscope in accordance with claim 2, wherein said vibrating body is consisting of alumina.

12. A vibratory gyroscope in accordance with claim 2, wherein said vibrating body is consisting of glass.

* * * * *